US006057074A

United States Patent [19]

Matsuda et al.

[11] Patent Number: 6,057,074

[45] Date of Patent: May 2, 2000

[54] METHOD OF FORMING AN IMAGE AND A RECORDING MEDIUM USED THEREFOR

[75] Inventors: Tsukasa Matsuda; Yasuhiro Toda; Yuichi Fukuda; Tetsuo Yamada; Takayuki Yamashita, all of Nakai-machi, Japan

[73] Assignee: Fuji Xerox Co., Ltd., Tokyo, Japan

[21] Appl. No.: 09/238,031

[22] Filed: Jan. 27, 1999

[30] Foreign Application Priority Data

Feb. 10, 1998 [JP] Japan .................................. 10-028967

[51] Int. Cl.$^7$ ............................. G03G 13/20; B32B 9/04; B32B 23/08

[52] U.S. Cl. ......................... 430/124; 428/411.1; 428/511

[58] Field of Search ......................... 430/124; 428/411.1, 428/511

[56] References Cited

U.S. PATENT DOCUMENTS

| | | | |
|---|---|---|---|
| 5,087,536 | 2/1992 | Aslam et al. | 430/13 |
| 5,933,694 | 8/1999 | Yamashita et al. | 430/124 |

FOREIGN PATENT DOCUMENTS

| | | |
|---|---|---|
| 63-92965 | 4/1988 | Japan . |
| 5-216322 | 8/1993 | Japan . |

*Primary Examiner*—Roland Martin
*Attorney, Agent, or Firm*—Oliff & Berridge, PLC

[57] ABSTRACT

A method of forming an image for transferring, to a predetermined recording medium, a toner image transported to a transfer position by a toner image support for supporting the toner image and transporting the image from a predetermined toner image forming position to a predetermined toner image transfer position, wherein the method comprises the steps of:

adhering a transported toner image to the recording medium, and transferring and fixing the image under heating; and using a recording medium which has a thermoplastic light transmissive resin layer disposed on the surface of a substrate, and in which a tensile modulus of elasticity E (N/mm$^2$) in a cross direction (CD direction) of the substrate of the recording medium and a thickness (t) mm of the substrate satisfy the following relation (1):

$$E \cdot t^3 \geqq 8 (N \cdot mm)$$

An image forming method and a recording medium used therefor can provide uniform gloss of images identical with that of the recording medium, irrespective of an image density and an image area ratio, without causing color shadow and, particularly, greatly reduce curling in the recording medium after image formation.

12 Claims, 7 Drawing Sheets

<Condition>
Toner: 7 µm polyester toner
Toner transfer amount: 0.65 mg/cm$^2$

METHOD OF FORMING AN IMAGE AND A RECORDING MEDIUM USED THEREFOR

BACKGROUND OF THE INVENTION

1. Field of the Invention

The present invention concerns a method of forming an image capable of providing a satisfactory gloss characteristic, image quality and curling characteristic, as well as a recording medium used for the method, for example, in a printer and a copying machine adopting a simultaneous transferring/fixing method of transferring a toner image formed by an indirect electrophotographic process on a recording medium and fixing the toner image upon transfer on the recording medium.

2. Statement of the Related Art

In recent years, preparation of color images has been conducted vigorously by using a digital indirect electrophotographic process. The digital indirect dry electrophotographic process forms an image, generally, by electrostatically developing toners of each of yellow, magenta, cyan and black colors prepared by mixing colorants such as pigment and dye in a thermoplastic resin, on a light sensitive material as an image support addressed digitally by exposure light converted from image information into optical information, and electrostatically transferring onto a recording medium the toner images thus formed and then melting and fixing the images by heating and pressing.

The toner used in the indirect dry electrophotographic process has a particle diameter from 5 μm to 12 μm and is generally transferred by a weight of 0.3 to 1.2 mg/cm$^2$ per color on the recording medium. The thermoplastic toner is transferred by 1 to 4 layers on the recording medium depending on the desired hue. While these kinds of toner are softened and melted during heating, not all of them are penetrated into paper as a usual recording medium even in a heated and pressed state, for example, in the transferring/fixing step and are formed on the recording medium being raised 5 μm to 20 μm.

FIG. 1 shows the relation between an input image area ratio and an image gloss of the image thus formed on the recording medium. FIG. 1 is a graph illustrating a result of measuring 75° mirror glossiness according to JIS P 8142 for a magenta image formed on cast coat paper as high gloss coat paper (Enamel coat/manufactured by Yonago Kako Seishi Co.), J coat paper as medium gloss coat paper (manufactured by Fuji Xerox Co.) and non-coated common J paper as low gloss paper (manufactured by Fuji Xerox) as an recording medium by using line screen while varying an input image area ratio.

FIG. 2 shows an image profile for a 40% image area ratio portion measured by a three-dimensional surface roughness meter for the thus obtained image on the cast coat paper. As can be seen from FIG. 1 and FIG. 2, while the image has a relatively high gloss in a solid image area, incident light scatters widely in a half tone region or a highlighted region since the toner fixed portion (image area) disposed in accordance with the shape of lines or dots is raised in a convex form from the recording medium, so that when an image of relatively large density gradation such as a portrait image, a high gloss region and a low gloss region are mixed together in the image to give a feeling of incongruity. Furthermore, it has been known that the color reproducibility is lowered in such an uneven image due to the effect of random reflection on the surface of the image to result in an image of low sharpness. Furthermore, it has known that the surface uneven image on a transparent recording medium lowers color formation due to scattering of transmission light in the case of OHP projection as well.

In order to improve the quality of such a color image, Japanese Published Unexamined Patent Application No. Sho 62-92965 proposes a method of providing a transparent resin layer on a recording medium, transferring toner on the recording medium and then burying it into the transparent resin layer by a roll heat-fixing machine. In this method, however, an oil membrane of a low surface tension is formed between the toner and the thermoplastic transparent resin under the effect of a silicone oil as a releasing agent coated on a fixing heat roll, so that the toner is not effectively buried in the thermoplastic transparent resin layer to leave unevenness as it is on the surface.

For example, Japanese Published Unexamined Patent Application No. Hei 5-216322 proposes, for a similar purpose, a method of electrostatically transferring toner on a recording medium having, on the surface, a transparent resin layer made of a thermoplastic resin with a thickness from 20 to 200 μm, and then burying the toner into the transparent resin layer with a belt fixing machine. In this method, the toners are cooled sufficiently till they are transported to a peeling position by use of the belt-like fixing machine, use of the releasing oil is not necessary since the self coagulation force of the toner is utilized upon peeling and, further, a sufficient heating time can be obtained in a transferring/fixing step. However, even if the toner and the thermoplastic transparent resin layer can be melted sufficiently by belt heating, in the combination of a general toner resin and the thermoplastic surface layer resin as described in the prior art publication, compatibility between them during melting is not sufficient and difference in the refractive index is caused at the interface in the surface coating layer to result in lowering of color reproducibility or leave a little unevenness. In addition, transfer of the toner image to the recording medium is conducted electrostatically in both of the prior art publications, and the dielectric constant of the thermoplastic resin disposed on the surface of the recording medium is low, so that the transfer ratio is lowered upon multiple transfer of toner of different colors, particularly, for the final transfer color, to cause color shadow or lower the gamut.

Further, in the case of a recording medium having a thermoplastic resin layer disposed on the surface of the substrate, since the thermal property is different between the substrate and the resin layer, the resin heated and melted during fixing shrinks slightly upon cooling and solidification, to result in a large curl over the entire recording medium.

As a method of preventing the recording medium from curling, U.S. Pat. No. 5,087,536 proposes to provide, on the opposite side of the substrate, a resin having a melting point higher than that of a thermoplastic resin disposed on the recording surface of the recording medium. However, this method is not only fails to provide a sufficient anti-curling effect but also has a worry of causing running failure due to frictional force between resins during paper feeding.

OBJECT OF THE INVENTION

The present invention has been accomplished in view of the foregoing problems and it is an object of the present invention to provide a method of forming an image capable of providing image gloss which is uniform and identical with that of the recording medium irrespective of image density and image area ratio, not causing color shadow and, particularly, capable of greatly reducing curling in the recording medium after image formation. Another object of the present invention is to provide a recording medium used for such a method.

SUMMARY OF THE INVENTION

Among the objects described above, a method of forming an image capable of obtaining an image having an image gloss identical with that of a recording medium irrespective of image density and image area ratio and, particularly, excellent in curling characteristics can be provided by transferring, to a predetermined recording medium, a toner image transported to a transfer position by a toner image support for supporting the toner image and transporting the image from a predetermined toner image forming position to a predetermined toner image transfer position, wherein the method comprises the steps of:

adhering a transported toner image to a recording medium, and transferring and fixing the image under heating and using a recording medium in which a thermoplastic light transmissive resin layer is disposed on the surface of a substrate, and a tensile modulus of elasticity E ($N/mm^2$) in a cross direction (CD direction) of the substrate of the recording medium and the thickness (t) mm of the substrate satisfy a relation represented by the following formula (1):

$$E \cdot t^3 \geqq 8 (N \cdot mm)$$

The substrate for the recording medium used for the method of forming the image according to the present invention generally includes paper medium. In the present invention, a fiber-flowing direction in paper as the substrate (direction in making paper) is defined as machine direction (MD direction) and a direction in perpendicular thereto is defined as cross direction (CD direction).

A further reduced curling characteristic can be attained when the thickness of the light transmissive resin layer disposed on the surface of the substrate is from 2 to 20 $\mu$m in addition to the conditions described above.

In addition to the prevention of curling, an image superior in the curling characteristic, image quality and gloss characteristic can be formed by using the light transmissive resin constituting the thermoplastic light transmissive resin layer located on the surface of the recording medium having a softening point (Tmp) relative to the softening point (Tmt) of the toner used for image formation within a range from +10° C. to −40° C. (Tmt −40° C.$\leqq$Tmp$\leqq$Tmt+10° C.), by heating the toner image support to a surface temperature higher than the softening point of the toner (Tmt) till the support reaches a toner image transfer position, and peeling the recording medium from the toner support when the surface temperature of the thermoplastic light transmissive resin layer (T) disposed on the surface of the recording medium at the downstream of the transferring/fixing position goes down by 10° C. or more below the softening point of the transparent resin (Tmt) (T$\leqq$Tmt−10° C.).

Further, the recording medium according to the present invention usable preferably in the method of forming the image has a thermoplastic light transmissive resin layer on at least an image recording surface of a substrate, wherein the relation between the tensile modulus of elasticity in the cross direction (CD direction) of the substrate of the recording medium E ($N/mm^2$) satisfies $E \cdot t^3 \geqq 8$ (N·mm). The thickness of the thermoplastic transparent resin layer is preferably from 2 to 20 $\mu$m.

Since the recording medium of the present invention has a rigidity capable of preventing deformation caused by shrinkage of the thermoplastic light transmissive resin layer formed on the surface, the entire recording medium can prevent undesirable curling effectively without undesirable modification to the handlability of the recording medium such as reduction of the entire thickness, by satisfying the relation $E \cdot t^3 \geqq 8$ (N·mm) between the tensile modulus of elasticity E ($N/mm^2$) in a CD direction and the thickness (t) mm of the substrate.

BRIEF DESCRIPTION OF THE ACCOMPANYING DRAWINGS

DESCRIPTION OF PREFERRED EMBODIMENTS

Figure 1:
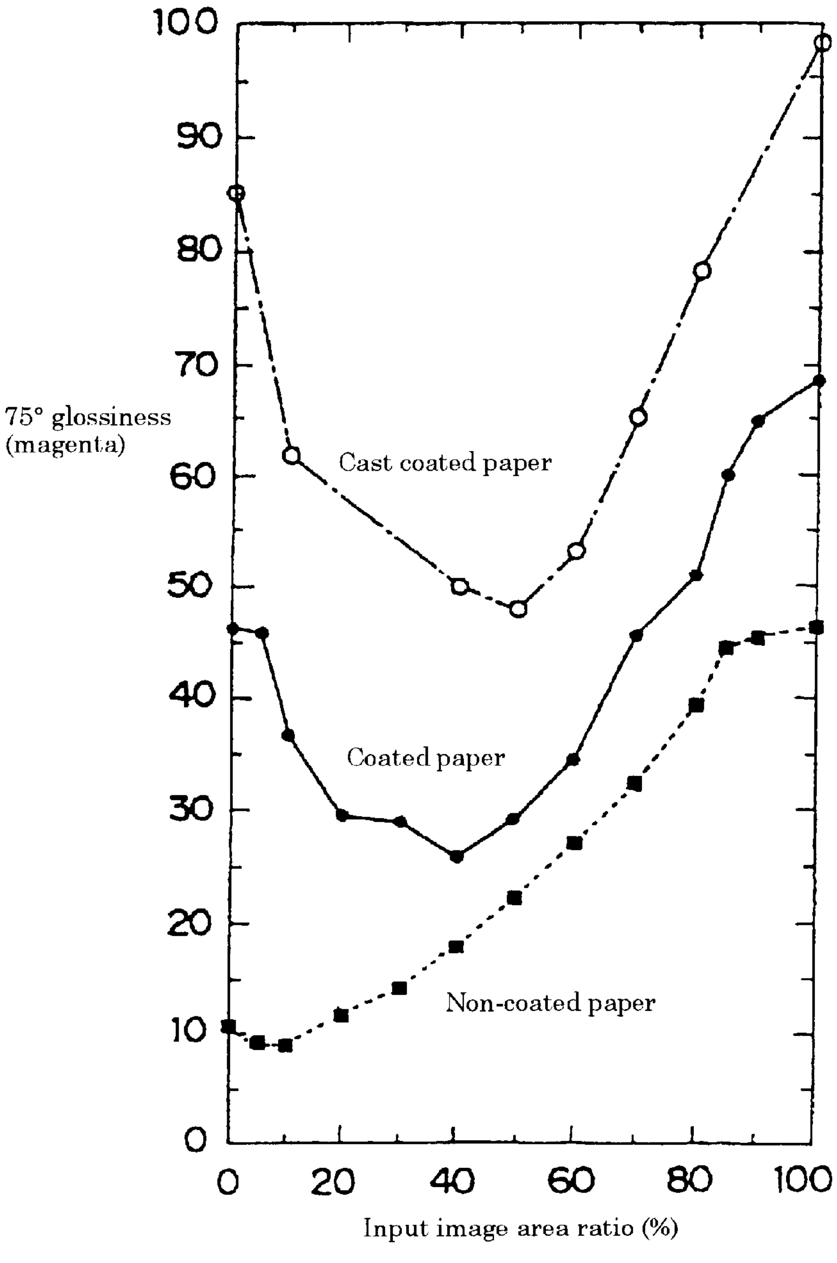
FIG. 1 is a graph showing a result of measurement for 75° mirror glossiness of images formed while varying input image area ratios for each kind of recording paper.
Figure 2:
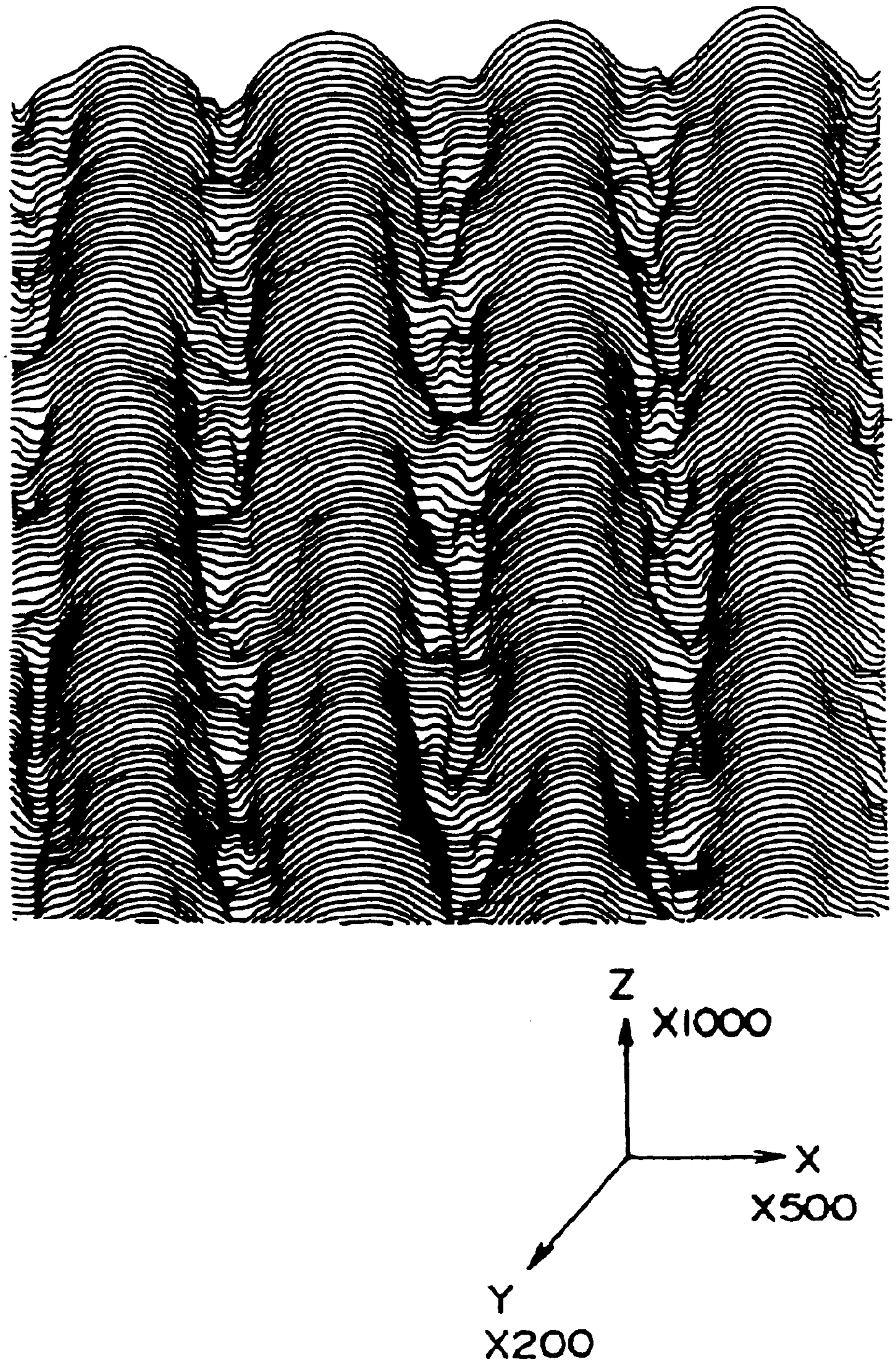
FIG. 2 is an image profile for a 40% image area ratio portion of toner images formed on a cast coat paper measured by a three-dimensional surface roughness meter.

The present invention will be further explained in details in accordance with the sequence of an electrophotographic process. In a printer or a copying machine, a digital electrophotographic process has been adopted generally as a system capable of providing images at high speed and with high quality. In this process, a light sensitive medium is optically scanned using an optical beam adjusted to a predetermined spot diameter by an image focussing optical system, and latent images subjected to area modification corresponding to images density signals are formed on a light sensitive medium depending on ON-OFF time of the optical beam in accordance with the image density signals determined by a pulse width modulator.

The latent image is visualized by a toner to form an image. The image forming step of forming the toner image is not restricted to the electrophotographic process described above. The step may be, for example, (1) a step of directly flying toner based on digitally processed image data onto a predetermined toner image support, thereby forming a toner image on the toner image support, (2) a step of forming a latent magnetic image based on digitally processed image data onto a predetermined toner image support and forming a toner image based on the latent magnetic image on the toner image support, or (3) a method of directly writing an electrostatic image based on digitally processed image data on a predetermined toner image support, forming a latent electrostatic image and then forming a toner image on a toner image support based on the latent static image.

The toner image on the toner image support formed as described above can be once transferred primarily on an intermediate transfer medium and then transferred and fixed simultaneously on a recording medium. In this case, the intermediate transfer material corresponds to the toner image support referred to in the present invention.

Explanation will be made to a method of electrostatically transferring a toner image on an intermediate transfer material based on an electrophotographic process and then simultaneously transferring and fixing the image on the recording medium.

The intermediate transfer material, like paper used for a as usual recording medium, less undergoes the environmental effects (temperature/humidity) and is stable in view of physical property such as surface property and resistance value, so that electrostatic transfer can be conducted under intimate contact and, if an appropriate physical property value is given, distortion or unevenness of the toner image due to distortion or disturbance of the transfer electric fields as described above scarcely occurs. Important factors required for the intermediate transfer material during electrostatic transfer are surface resistivity Rs(Ω) and volume resistivity Rv(Ω·cm) thereof and it is desirable that Rs is within a range $10^8<Rs<10^{16}$ while Rv is within a range $10^7<Rv<10^{15}$. If Rs and Rv are smaller than the above-mentioned ranges, the electric static charges are spread whereas if they are larger than the ranges, static charges are accumulated excessively.

The toner image electrostatically transferred on the intermediate transfer material is constituted with mesh or line structure as picture elements comprising an assembly of toner and the image density is obtained depending on the area ratio. The toner image is transferred and fixed in a transferring/fixing section to the recording medium. Accordingly, since electrostatic multiple transfer is not conducted directly to the recording medium, it is possible to obtain an image free from distortion of the image as described above, and a clear image with no transfer unevenness can be obtained on the image support. The toner image is transferred and fixed in the transferring/fixing section to the recording medium.

In the transferring/fixing portion, the intermediate transfer material as the image support, the toner image and the recording medium are brought into close contact and heated integrally, in which powdery toner is put to a molten state and individually fused to each other to form a film-like shape. In this case, it is necessary that the intermediate transfer material and the recording medium are brought into close contact with each other for efficient heat transfer to the toner image and submerging of the molten toner into the recording medium.

In order to submerge the molten toner into the recording medium, a thermoplastic transparent resin is disposed on the surface of the recording medium. As a result of an earnest study made by the present inventor, it has been found that when a recording medium having a thermoplastic resin layer formed on the surface thereof is used, the heated and molten thermoplastic resin develops shrinking force upon cooling after forming the image and, if the shrinking force thus formed is stronger than the rigidity of the substrate, significant curling is caused in the entire recording medium. Furthermore, it has been found that curling is further increased as the thickness of the thermoplastic resin layer is increased. The present invention has been accomplished on the basis of the findings described above.

Figure 3:
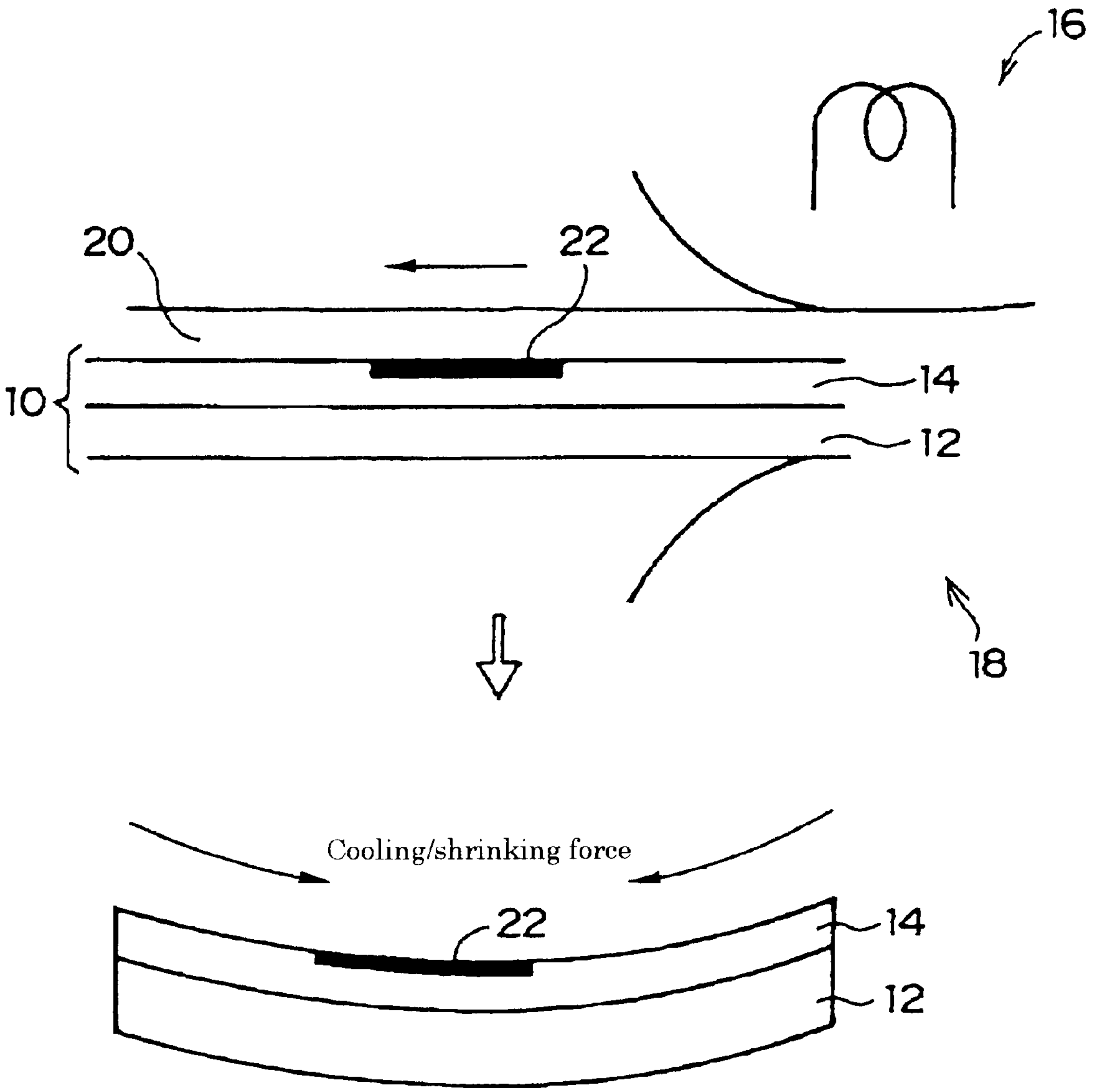
FIG. 3 is a conceptional view illustrating a phenomenon for the occurrence of curling after transferring and fixing of toner by heating and pressing in a recording medium coated with a thermoplastic resin.

That is, as shown in the conceptional view of FIG. 3, a recording medium 10 in which a thermoplastic resin layer 14 is disposed on the surface of a substrate 12 is heated upon passage between a heat roll 16 and a press roll 18 during transferring/fixing, and the thermoplastic resin is softened and swollen. In this state, the toner image 22 is in close contact with the intermediate transfer belt 20 as the toner support, and the toner image 22 is fixed the recording medium 10 and then peeled off from the toner support 20. In this case, curling occurs with the thermoplastic resin being inside in the recording medium 10 due to the shrinking force caused when the thermoplastic resin is cooled, from a plane in a state where the thermoplastic resin is swollen. As a result of a study on the relation between the curling mechanism and the physical property of the substrate, and the thermoplastic resin layer, surprising finding has been made that curling can be prevented effectively by defining a value obtained by multiplying the tensile modulus of elasticity of the substrate E ($N/mm^2$) by $t^3$ ($mm^3$) for the thickness of the substrate. It has further been found that the effect is remarkable if the thickness of the thermoplastic resin layer is 20 μm or less.

There is no particular directionality for the tensile modulus of elasticity of the substrate E ($N/mm^2$) so long as the substrate has a uniform strength as in a synthetic resin film or a metallic sheet. However, in the case of a paper substrate used generally for a recording medium, the direction of fibers tends to be aligned in the paper making direction in which the physical property such as the strength and the tensile modulus of elasticity differs greatly between the paper making direction, namely, a machine direction (MD direction) and a cross direction (CD direction) perpendicular thereto. Since strength in the cross direction (CD direction) is low, the physical property in the cross direction (CD direction) contributes greatly to the curling characteristic and the tensile modulus of elasticity of the substrate E ($N/mm^2$) in the cross direction (CD direction) is represented also in the present invention. In the present invention, when a material paper provided with a white pigment coat layer or a back coat layer is used as a substrate, the material paper and the coat layer are collectively referred to as a substrate.

Figure 4:
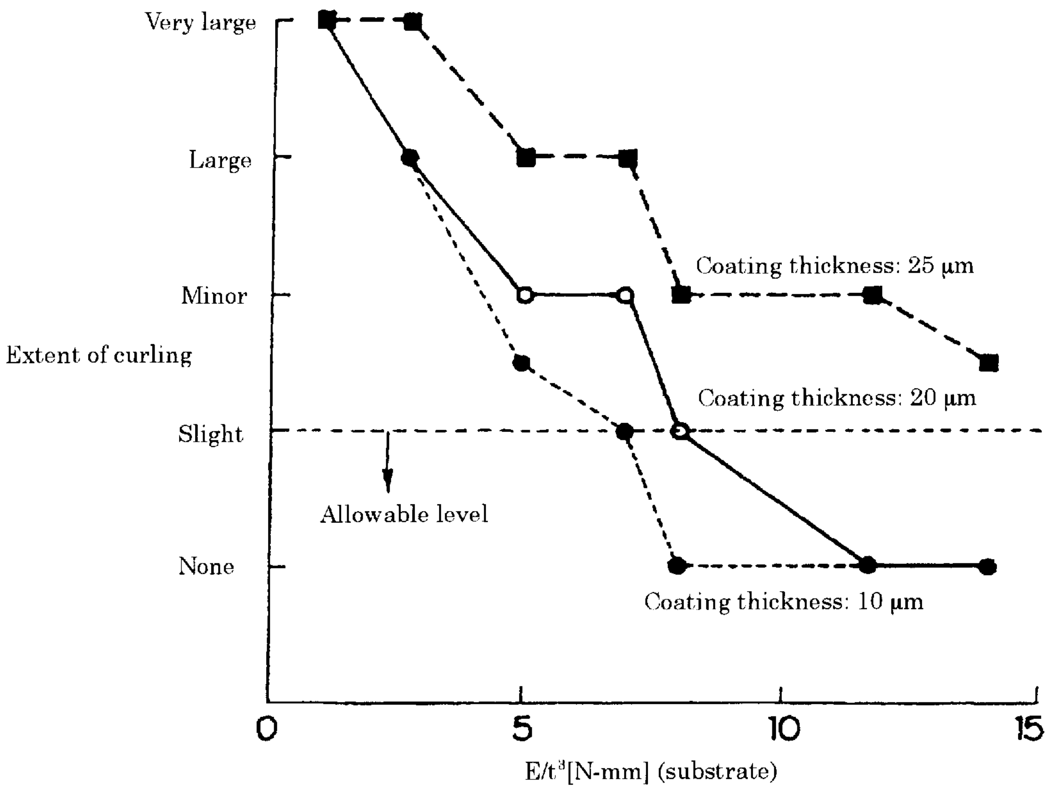
FIG. 4 is a view illustrating a relationship for the extent of curling relative to a formula of the tensile modulus of elasticity and the thickness of the substrate of the recording medium in relation with the coating thickness of a thermoplastic resin.

FIG. 4 shows a result of evaluation for the relation between the $E \cdot t^3$ in the cross direction (CD direction) of the substrate and the magnitude of curling while varying the thickness of the thermoplastic resin on the substrate. As can be seen from FIG. 4, occurrence of curling is effectively suppressed if $E \cdot t^3$ is 8 (N·mm) or less, and the trend is remarkable if the thickness of the thermoplastic resin layer is 20 μm or less, and curling exceeding an allowable level that affects the appearance of the recording medium scarcely occurs when the two conditions described above are satisfied.

The mechanism of providing such an advantageous effect has not yet been apparent at present. In the relation between the rigidity of the substrate represented typically by the tensile modulus of elasticity and the thickness, the resistivity to the shrinking force of the resin layer is usually improved as the thickness is larger and the rigidity is increased in the substrate. However, if only the thickness of the substrate is made excessively larger, for instance, curling can be prevented, but heat conductivity is lowered to make insufficient the softening of the thermoplastic resin constituting the resin layer by heating in the transferring/fixing section, possibly making it impossible to obtain a smooth image. On the other hand, while curling can be prevented by increasing the rigidity of the substrate, this results in a problem that the soft and flexibility of the recording medium itself is deteriorated, thereby worsening the transportability and the handleability in an image forming apparatus.

Accordingly, the present invention has a remarkable merit in that curling can be prevented effectively without deteriorating the function as the recording medium, by keeping a balance between each of the physical properties.

While the tensile modulus of elasticity of the recording medium substrate in the present invention can be measured by a known method, there can be mentioned concretely a method of measuring the tensile modulus of elasticity for a substrate pretreated in accordance with JIS P 8111, by using Strograph V-LC manufactured by TOYOSEIKI SEISAKUSHO CORP. at a grip distance of 150 mm and a tensile speed of 20 mm/s. The thickness of the substrate can be measured by a method according to JIS P 8118 for a substrate pretreated by JIS P 8111.

The thickness of the thermoplastic resin layer is preferably 20 μm or less and, in view of the smoothness of the toner image, it is preferably within a range from 2 to 20 μm and, more preferably, within a range from 3 to 17 μm. As apparent from the graph shown already in FIG. 4, if the thickness of the resin layer exceeds 20 μm, it is not preferred in view of the balance with the shrinking force of the resin layer since the effect of the present invention may possibly be reduced.

The thermoplastic resin layer of the recording medium will be explained. The resin constituting the thermoplastic resin layer disposed on the surface of the recording medium preferably has a softening point (Tmp) substantially equal to or lower than the softening point (Tmt) of the toner since this has a higher effect of submerging the toner resin even when the thermoplastic resin and the toner on the surface of the recording medium are heated to an identical temperature, and the recording medium has increased adhesion with the image support and is brought into closer contact therewith, so that minute gloss unevenness is not caused. Specifically, the softening point (Tmp) of the transparent resin constituting the thermoplastic transparent resin layer disposed on the surface of the recording medium is preferably within a range from +10° C. to −40° C. relative to the softening point (Tmt) of the toner used for image formation (Tmt−40° C.≦Tmp≦Tmt+10° C.). More preferably, the thermoplastic resin disposed on the surface of the recording a medium is polyester series resins having a softening point (Tmp) within a range from ±0° C. to −20° C. relative to the softening point of the toner (Tmt) (Tmt−20° C.≦Tmp≦Tmt). If the softening point of the thermoplastic resin (Tmp) disposed on the surface of the recording medium exceeds by more than 10° C. relative to the softening point of the toner (Tmt), submergence of the molten toner into the transparent resin layer on the surface of the recording medium is disturbed. In addition, when a resin having a softening point of the thermoplastic resin (Tmp) goes down by more than 40° C. below the softening point of the toner (Tmt) is used, since the molten toner diffuses excessively in the outer surface layer of the recording medium, sharpness of the image is disturbed or the melt viscosity of the surface layer resin on the recording medium is lowered, thereby tending to cause peeling failure from the image support.

An elastic layer is disposed preferably on the surface of the intermediate transfer material in order to improve adhesion between the intermediate transfer material and the recording medium putting the toner image therebetween. The hardness of the elastic material constituting the elastic layer is preferably within a range from 10° to 80° expressed by rubber hardness as defined according to JIS A, and the thickness of the elastic layer is preferably from 10 μm to 300 μm. If the rubber hardness of the plastic material on the surface of the intermediate transfer material is lower than 10°, abrasion of the surface of the intermediate transfer material is accelerated, failing to obtain an image gloss. Further, if it exceeds 80°, once the toner becomes difficult to include, minute unevenness of gloss tends to occur. Further, if the thickness of the elastic material is smaller than 10 μm, since the toner cannot be included easily, minute unevenness of gloss tends to occur. If it exceeds 300 μm, an enormous amount of electric power is undesirably required for heating the belt.

Further, the transferring/fixing section comprises a press roll that puts an intermediate transfer material, a toner image and a paper between it and a heat roll having a heat source such as a halogen lamp inside and brings them into contact under pressure. The nip pressure is desirably within a range from $1\times10^3$ Pa to $1\times10^6$ Pa. If the pressure is lower than the range, close contact is not attained for the intermediate transfer material, the toner image and the recording medium, tending to make insufficient penetration of a molten toner into the recording medium or tending to cause minute unevenness of gloss. If the pressure is higher, stresses on the intermediate transfer material and the recording medium is increased to result in creasing or bring about trouble of complicating the mechanism and the device for withstanding such high pressure. The heat roll may be replaced with a stationary heat generating member comprising an electric heat generating body disposed on a heat resistant support, the surface of which is covered with a heat resistant and abrasion resistant layer.

For preheating the intermediate transfer material as an image support and the toner image, a heat generating lamp or a heat roll having a heat source inside disposed separately from the stationary heat generating member may be utilized but with no particular restriction thereto.

As the heating condition, it is preferred that the toner image support is heated to a surface temperature higher than the softening point of the toner (Tmt) till the support reaches the toner image transfer position.

Upon peeling the recording medium, the intermediate transfer material as the image support and the toner, the recording medium is peeled from the toner support at the downstream the transferring/fixing position when the surface temperature (T) of the thermoplastic transparent resin layer disposed on the surface of the recording medium goes down by 10° C. or more below the softening point (Tmt) of the transparent resin (T≦Tmt−10° C.), thereby enabling to form an image excellent in curling characteristic, image quality and glossiness.

Figure 5:
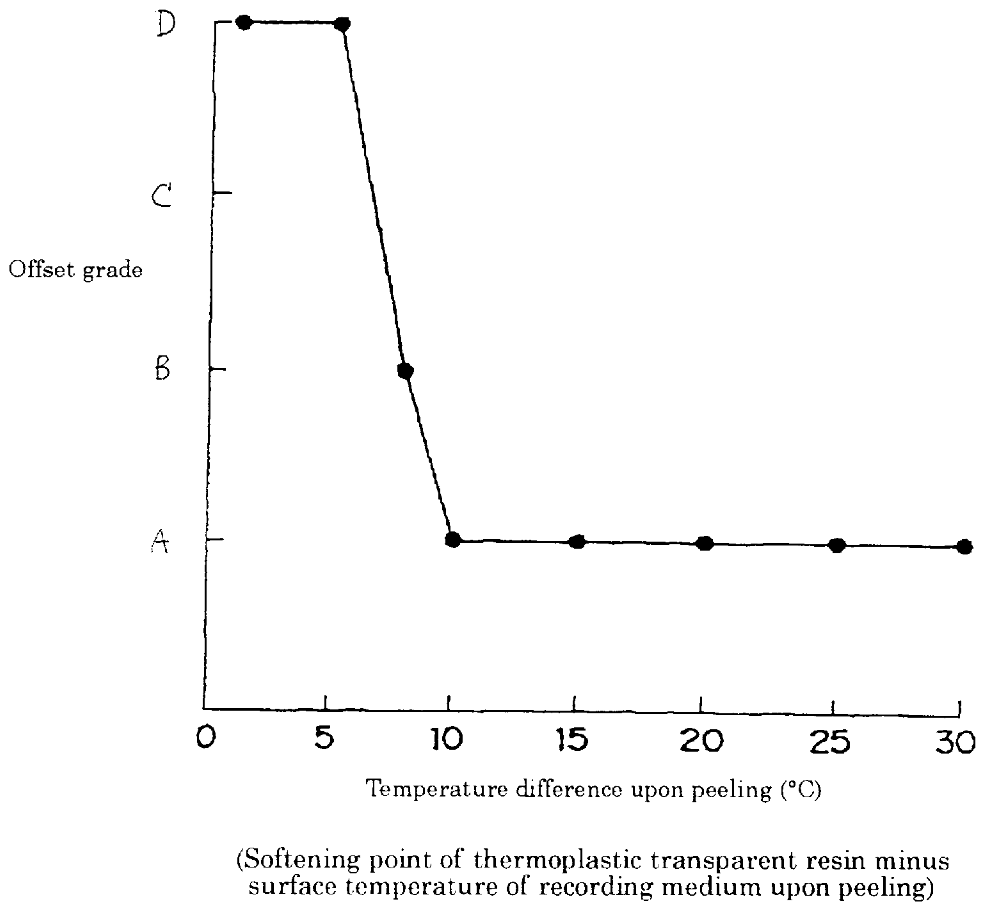
FIG. 5 is a graph showing a relation of the difference between the softening point of the transparent resin and the temperature of the recording medium at the peeling position relative to the offset grade on the surface of the peeled recording medium.

FIG. 5 is a graph showing a relation between the temperature difference for the temperature on the surface of the recording medium upon peeling relative to the softening point of the transparent resin (Tmp), and the extent for the occurrence of offset in the image forming method according to the present invention.

The extent for the occurrence of offset is judged in accordance with the following standards:

(Judging Standard for Offset Grade)

A: No trouble

B: Surface of the recording medium slightly roughened

C: Surface of the recording medium roughened

D: Significant peeling of the transparent resin layer

As apparent from FIG. 5, if the surface temperature of the recording medium upon peeling is lower than the softening point of the transparent resin (Tmt) disposed on a surface of the recording medium by a temperature difference of 10° C. or more ($T \leqq Tmt-10°$ C.), since the transparent resin layer disposed on the surface of the recording medium keeps no sufficient cohesion force, gloss is sometimes deteriorated by an offset phenomenon in which the transparent resin on the surface of the recording medium transfers to the image support or the surface of the recording medium is roughened upon peeling. In view of the above, in the method of forming the image according to the present invention, it is preferred that the surface temperature of the recording medium is sufficiently lower than the softening point of the transparent resin constituting the transparent resin layer upon peeling in view of the gloss of the image.

The surface temperature of the recording medium can be measured by a method of previously disposing thermocouple on the surface of the recording medium, and monitoring the temperature after the transfer and fixing of the toner to the image support till the peeling of the recording medium from the image support.

Further, the toner softening point (Tmt) and the softening point of the transparent resin (Tmp) disposed on the surface of the recording medium in the present invention are measured as described below. As the toner and the transparent resin disposed on the surface of the recording medium to be used for a specimen, fine powders each accurately weight by 1 to 3 g were used. The plunger cross section is set to 10 $cm^2$. In the measurement, a flow tester CFT 5000C manufactured by Shimadzu Corp. is used, and the temperature is elevated at a constant rate under the conditions at a starting temperature from 80° C. to maximum temperature of 170° C., a temperature elevation rate of 3° C./min, a preheating time of 300 sec, a cylinder pressure of 10 $kgf/cm^2$ and die $L \times D=1.0$ mm$\times$1.0 mm. In this case, the specimen such as the toner is gradually heated and starts to flow as the temperature is elevated at a constant rate. Further, the specimen in a molten state flows out greatly at a further elevated temperature, the depression of the plunger is stopped to complete measurement. The amount of flow at each temperature is measured from 60 to 150° C. each at 3° C. interval to obtain an apparent viscosity $\eta'$ (Pa·s). The temperature at which the apparent viscosity $\eta'$ (Pa·s) reaches $1 \times 10^4$ Pa·s is defined as the softening point of the toner and the transparent resin disposed on the surface of the recording medium.

Figure 6:
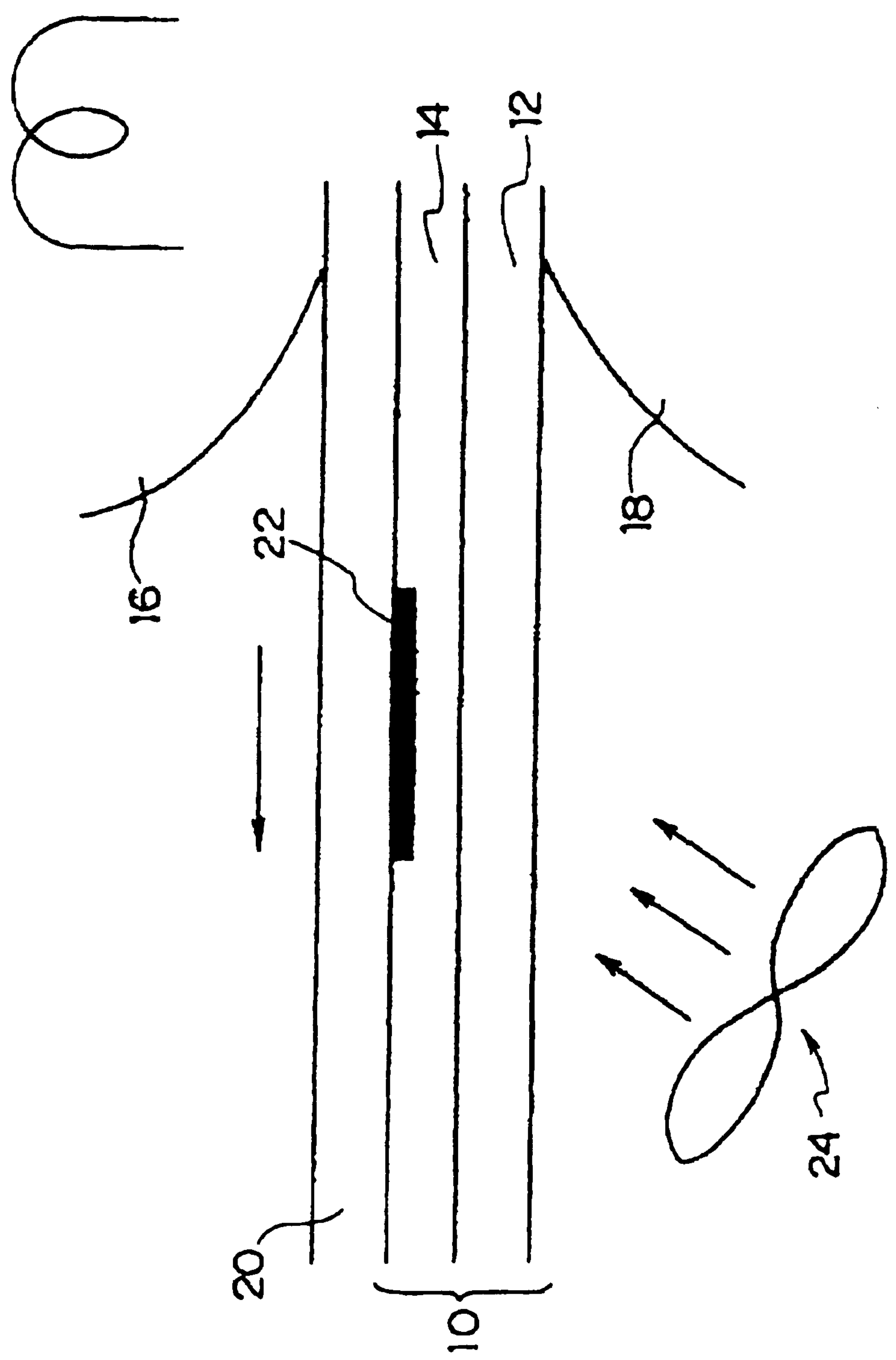
FIG. 6 is a conceptional view illustrating a state of cooling an intermediate transfer material, a toner image and a recording medium.

Since the surface of the recording medium is allowed to cool during transportation, a part for lowering the surface temperature of the recording medium is not always required in the image forming apparatus used in this image forming method. It is possible to effectively lower the surface temperature of the recording medium upon peeling and improve the gloss of image by transferring heat from a high temperature portion to a low temperature portion by a method of applying a cold blow to an intermediate transfer material, a toner image and a recording medium as shown in FIG. 6 or a method of bringing a low temperature member about at a room temperature as a cooler into contact with the intermediate transfer material or the recording medium. When the latter cooler is used, a continuous effect can be obtained by circulating a belt-shaped cooler to be contacted, bringing a portion on the circumference of the belt into contact with the intermediate transfer material or paper at the exit of a heating/pressing nip and cooling the belt in a different place. This may be attained also by heat exchange with other low temperature member through contact at a place different from the contact portion with the intermediate transfer material or paper at the exit of the heating/pressing nip, for example, by contact with the intermediate transfer material at low temperature before the heating zone. In addition, heat may be transferred by using a heat exchanger such as a heat pipe as a cooling medium at the exit of the heating zone.

The cooling effect can be attained by locating the cooler at the exit of the heating/pressing nip to either one or both of the heating members and the pressing members. If the cooler is disposed to the pressing member at a relatively low temperature, temperature elevation of the cooler can be suppressed, and the amount of heat deprived from the heating member can be reduced, to enable thermally efficient transfer and fixing.

Known toner binder resins can be used in the method of the present invention and they include, for example, homopolymers or copolymers of styrenes such as styrene, vinyl toluene, $\alpha$-methyl toluene, chlorostyrene and amino styrene, as well as their derivatives or substituted materials; homopolymers or copolymers of methacrylic acid and methacrylates such as methyl methacrylate and ethyl methacrylate, homopolymers or copolymers of acrylic acid and acrylates such as methyl acrylate, butyl acrylate and 2-ethyl hexyl acrylate; homopolymers of dienes such as butadiene and isoprene, vinyl monomers such as acrylonitrile, vinyl ethers, maleic acid anhydride, vinyl chloride and vinyl acetate or copolymers thereof with other monomers, polyamides, polyesters and polyurethanes alone or in admixture, polyesters being particularly preferred.

The polyester can be prepared by reaction between a polyhydric alcohol and a polybasic carboxylic acid. The polyhydric alcohol constituting the polyester can include, for example, diols such as ethylene glycol, diethylene glycol, triethylene glycol, 1,2-propylene glycol, 1,3-propylene glycol, 1,4-butanediol, neopentyl glycol, 1,4-butanediol, cyclohexane dimethanol, bisphenol A such as hydrogenated bisphenol A, alkylene oxide adduct of polyoxypropylenated bisphenol A, and other dihydric alcohols.

The polybasic carboxylic acid can include not limitedly, for example, maleic acid, fumaric acid, mesaconic acid, citraconic acid, itaconic acid, terephthalic acid, isophthalic acid, cyclohexane dicarboxylic acid, succinic acid, acid anhydride and alkyl esters thereof and other dibasic carboxylic acids.

As the colorant mixed with the toner binder resin, known pigments and dyes can be used. In addition, known external additives can be used with an aim, for example, of charge control.

The recording medium used in the method of forming the image according to the present invention will be explained. There is no particular restriction on the substrate of the recording medium and any of known recording mediums can be used. Particularly, the effect of the present invention can be attained remarkably by using acidic or neutral high quality paper or medium quality paper, woody paper, regenerated paper, synthetic paper, and coated paper having a white pigment coat layer. Among them, coat paper having white pigment coat layer is the most preferred in view of the color formation.

A value obtained by multiplying the tensile modulus of elasticity (N/mm) in the cross direction (CD direction) of the substrate by $(t: thickness)^3$ is 8 (N/mm) or more, preferably, 10 (N·mm) or more. In order to satisfy this condition, it is desirable to increase the tensile modulus of elasticity of the substrate but it is not desirable to increase the degree of fiber beating (C.S.F.) or excessively increasing the amount of fillers to be described later in the case, for example, of using paper as the substrate. A larger thickness is more desirable and it is effective, although not limitative, that the thickness is 100 $\mu$m or more, preferably, 120 $\mu$m for suppressing curling.

There is no particular restriction on the filler used for the substrate and there can be utilized inorganic fillers, for example, calcium carbonate such as heavy calcium carbonate, light calcium carbonate and chalk, silicic acid such as kaolin, sintered clay, pyrophyllite, sericite and talc, and inorganic fillers such as titanium dioxide, as well as organic pigments such as urea resin and styrene. There is also no particular restriction on the sizing agent. A sizing agent such as rosin sizing agent, synthetic sizing agent, petroleum resin sizing agent and neutral sizing agent can be used in combination with an appropriate sizing agent and fiber fixing agent such as aluminum sulfate and cationized starch. In addition, paper strength improver, dye and pH controller may be added.

Further, as described previously, it is preferred to provide a white pigment coat layer in view of the color formation, and the white pigment usable for the white pigment coat layer can include, not limitedly, for example, mineral pigments such as heavy calcium carbonate, light calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, sintered kaolin, delaminate kaolin, alumino silicate, sericite, bentonite and smectite, as well as fine polystyrene resin particles, fine urea formalin resin particles, minute hollow particles and other organic pigments, alone or in combination.

Further, as the resin for binding the white pigment to form the coat layer, water soluble adhesives, emulsions or latexes may be used alone or in admixture. There can be mentioned, not limitedly, for example, water soluble resins such as polyvinyl alcohol, modified polyvinyl alcohol, starch, gelatin, casein, methyl cellulose, hydroxy ethyl cellulose, acrylic amide-acrylic acid ester copolymer, acrylic amide-acrylic acid-methacrylic acid terpolymer, styrene-acrylic resin, isobutylene-maleic acid anhydride resin and carboxymethyl cellulose, acrylic emulsion, vinyl acetate emulsion, vinylidene chloride emulsion, polyester emulsion, styrene-butadiene latex and acrylonitrile-butadiene latex. In addition, it is possible to add a minor amount of a dye or colored pigment for controlling the tone or a fluorescent dye in order to improve the visual whiteness to the white pigment coat layer. Further, it is also possible to optionally add various kinds of auxiliary agents such as dispersant, defoamer, plasticizer, pH controller, lubricant, flow modifier, solidification promoter, water proofing agent and sizing agent as required.

In addition to the substrate described above, there can be utilized those film-like materials having a heat resistant temperature of 100° C. or higher such as polyethylene terephthalate film, polysulfone film, polyphenylene oxide film, polyimide film, polycarbonate film and cellulose ester film.

A thermoplastic transparent resin layer is disposed on at least one surface of the substrate sheet in order to transfer and fix molten toner simultaneously and penetrate into the surface layer of the recording medium. As the thermoplastic transparent resin, there can be used, for example, homopolymers or copolymers of styrenes such as styrene, vinyl toluene, α-methyl toluene, chlorostyrene and amino styrene, as well as their derivatives or substituted materials; homopolymers or copolymers of methacrylic acid and methacrylic acid esters such as methyl methacrylate and ethyl methacrylate; homopolymers or copolymers of acrylic acid and acrylic acid esters such as methyl acrylate, butyl acrylate and 2-ethyl hexyl acrylate; homopolymers of dienes such as butadiene and isoprene, vinyl monomers such as acrylonitrile, vinyl ethers, maleic acid anhydride, vinyl chloride and vinyl acetate or copolymers thereof with other monomers, polyamides, polyesters and polyurethanes alone or in admixture, polyesters being particularly preferred. The polyester can be prepared by reaction between a polyhydric alcohol and a polybasic carboxylic acid. The polyhydric alcohol constituting the polyester can include, for example, diols such as ethylene glycol, diethylene glycol, triethylene glycol, 1,2-propylene glycol, 1,3-propylene glycol, 1,4-butanediol, neopentyl glycol, 1,4-butanediol, cyclohexane dimethanol, bisphenol A such as hydrogenated bisphenol A, alkylene oxide adduct of polyoxypropylenated bisphenol A and like other dihydric alcohols.

The polybasic carboxylic acid can include, not limitedly, for example, maleic acid, fumaric acid mesaconic acid, citraconic acid, itaconic acid, terephthalic acid, isophthalic acid, cyclohexane dicarboxylic acid, succinic acid, acid anhydride and alkyl esters thereof and other dibasic carboxylic acids.

Various kinds of additives can be blended with the transparent resin within such a blending amount as not deteriorating the image quality. For example, with an aim of controlling the surface electric resistivity, there may be mixed inorganic materials such as sodium chloride, potassium chloride, calcium chloride, sodium sulfate, zinc oxide, titanium dioxide, tin oxide, aluminum oxide and magnesium oxide and organic materials such as alkyl phosphate salts, alkyl sulfate salts, sodium sulfate salts and quaternary ammonium salts, alone or in admixture. Further, with an aim of controlling the friction coefficient of the recording medium, a slight amount of plastic particles such as of styrene or inorganic powder may be mixed, or various kinds of surfactants may be coated.

The thickness of the thermoplastic transparent resin is preferably from 2 μm to 20 μm and, further preferably, from 3 μm to 17 μm. If the thickness is below the range, molten toner cannot be buried sufficiently and forms raised images. On the other hand, if the thickness exceeds the upper limit, since the shrinking force after hot melting the thermoplastic resin is increased, it exceeds the rigidity of the substrate to undesirably increase curling For the transparent resin, preferably, the polyester resin, it is preferred to select those having a softening point (Tmp) within a range from −10° C. to −40° C., preferably, from ±0° C. to −30° C. relative to the softening point of the toner (Tmt) as described previously.

As has been described specifically, according to the method of forming the image of the present invention, images of uniform gloss can be formed with no curling to the recording medium. Further, the recording medium according to the present invention can effectively prevent curling caused by the transparent resin layer image after recording and can provide images of excellent gloss.

EXAMPLE

The present invention is to be explained more specifically by way of examples but the invention is not limited to the examples below.

(Preparation of Recording Medium)

A substrate of a recording material was prepared by applying coating material for a white pigment coat layer comprising 87 parts of a white pigment of kaolin and calcium carbonate at a 71/29 part blending ratio and 13 parts of an adhesive of styrene-butadiene rubber (SBR) and polyvinyl alcohol (PVA) at a 69/31 part blending ratio to stock paper of 130 g/m$^2$ base weight such that the coating amount after drying was 20 g/m$^2$ on the felt surface and 10 g/m² on the wire surface of the stock paper by a Labocoater. The substrate thus obtained is referred to as a substrate K1.

The substrate K1 had a tensile modulus of elasticity (E) of 3600 N/mm$^2$, a thickness (t) of 0.148 mm and E·t$^3$ of 11.7 N·mm.

Then, a white pigment coat layer was formed in the same manner as in K1 except for using a stock paper of 120 g/m$^2$ base weight, to obtain a substrate K2. The substrate K2 had a tensile modulus of elasticity (E) of 3500 N/mm$^2$, a thickness (t) of 0.126 mm and E·t$^3$ of 7.0 N·mm.

Further, a substrate K3 was obtained by using a stock paper of 80 g/m$^2$ base weight and coating 15 g/m$^2$ on the felt surface and 5 g/m$^2$ on the wire surface of the stock paper, by a Labocoater, with the coating material for the white pigment coat layer used for the preparation of the substrate K1 to obtain a substrate K3. The substrate K3 had a tensile modulus of elasticity (E) of 2900 N/mm$^2$, a thickness (t) of 0.097 mm and E·t$^3$ of 2.7 N·mm.

Three types of polyesters (PE1, PE2, PE3) having characteristics shown in Table 1 were prepared, each of them was mixed by 20 parts by weight with 80 parts of ethyl acetate, stirred till it was dissolved, and the surface of each of the three types of the substrates (K1, K2, K3) was coated with each of the solutions of the three kinds of the polyesters by using a Mayer bar. It was controlled such that the coating thickness after sufficient drying was 10 μm, 20 μm and 25 μm. The recording mediums thus obtained are referred to as P1 (10 μm, 20 μm, 25 μm), P2 (10 μm, 20 μm, 25 μm), P3 (10 μm, 20 μm, 25 μm), P4 (10 μm, 20 μm, 25 μm), P5 (10 μm, 20 μm, 25 μm), P6 (10 μm, 20 μm, 25 μm), P7 (10 μm, 20 μm, 25 μm), P8 (10 μm, 20 μm, 25 μm), P9 (10 μm, 20 μm, 25 μm), which are shown in the following Table 1. Images were formed by use of the recording mediums, using the toner and the image forming apparatus shown below.

TABLE 1

| Recording medium | Substrate | Polyester type | Thermoplastic polyester-constituting monomer | Tmp (° C.) | Coating thickness of thermoplastic resin (μm) |
|---|---|---|---|---|---|
| P1 | K1 | PE1 | BPA—EO, FMA, | 89 | 10, 20, 25 |
| P2 | K1 | PE2 | BPA—EO, BPA—PO, TPA, Glycerin | 100 | 10, 20, 25 |
| P3 | K1 | PE3 | BPA—EO, BPA—PO, Succinic acid derivative, TPA, TMA | 131 | 10, 20, 25 |
| P4 | K2 | PE1 | BPA—EO, FMA | 89 | 10, 20, 25 |
| P5 | K2 | PE2 | BPA—EO, BPA—PO, TPA, Glycerin | 100 | 10, 20, 25 |
| P6 | K2 | PE3 | BPA—EO, BPA—PO, Succinic acid derivative, TPA, TMA | 131 | 10, 20, 25 |
| P7 | K3 | PE1 | BPA—EO, FMA | 89 | 10, 20, 25 |
| P8 | K3 | PE2 | BPA—EO, BPA—PO, TPA, Glycerin | 100 | 10, 20, 25 |
| P9 | K3 | PE3 | BPA—EO, BPA—PO, Succinic acid derivative, TPA, TMA | 131 | 10, 20, 25 |

BPA-EO: polyoxyethylene(2,2)-2,2-bis(4-hydroxyphenyl) propane

BPA-PO: polyoxypropylene(2,2)-2,2-bis(4-hydroxyphenyl) propane

TPA: terephthalic acid

PMA: fumaric acid

DSA: dodecenyl succinic acid

TMA: trimellitic acid anhydride (Toner)

The method of preparing toners is to be explained. A polyhydric alcohol and a polybasic carboxylic acid of a starting composition shown in the following Table 2 was charged in a 1-liter-volume four-necked round bottom flask having a stainless steel stirrer, nitrogen gas introducing glass tube and a condenser, and the flask was set to a mantle heater. Then, a nitrogen gas was introduced from the gas introduction tube and the temperature was elevated while keeping an inert gas atmosphere inside the flask. Subsequently, 0.05 parts by weight of dibutyl tin oxide were added, and the reactants were reacted for a predetermined period of time while keeping the temperature of them at 200° C., to obtain a polyester resin used for the toner. 6 parts by weight of a yellow pigment, 4.5 parts by weight of a magenta pigment, 4.5 parts by weight of a cyan pigment and 4 parts by weight of a carbon black were mixed, respectively, with 100 parts by weight of the polyester resin thus obtained, melted by an extruder, kneaded, then cooled and pulverized by a jet mill and the pulverizes were classified to obtain toners of yellow, magenta, cyan and black each having of volume average diameter of 7 μm.

TABLE 2

| Toner binder | Constituent monomer | Tmt (° C.) |
|---|---|---|
| | BPA—EO, BPA—PO succinic acid derivative, TPA, TMA | 120 |

(Recording Apparatus 1)

Figure 7:
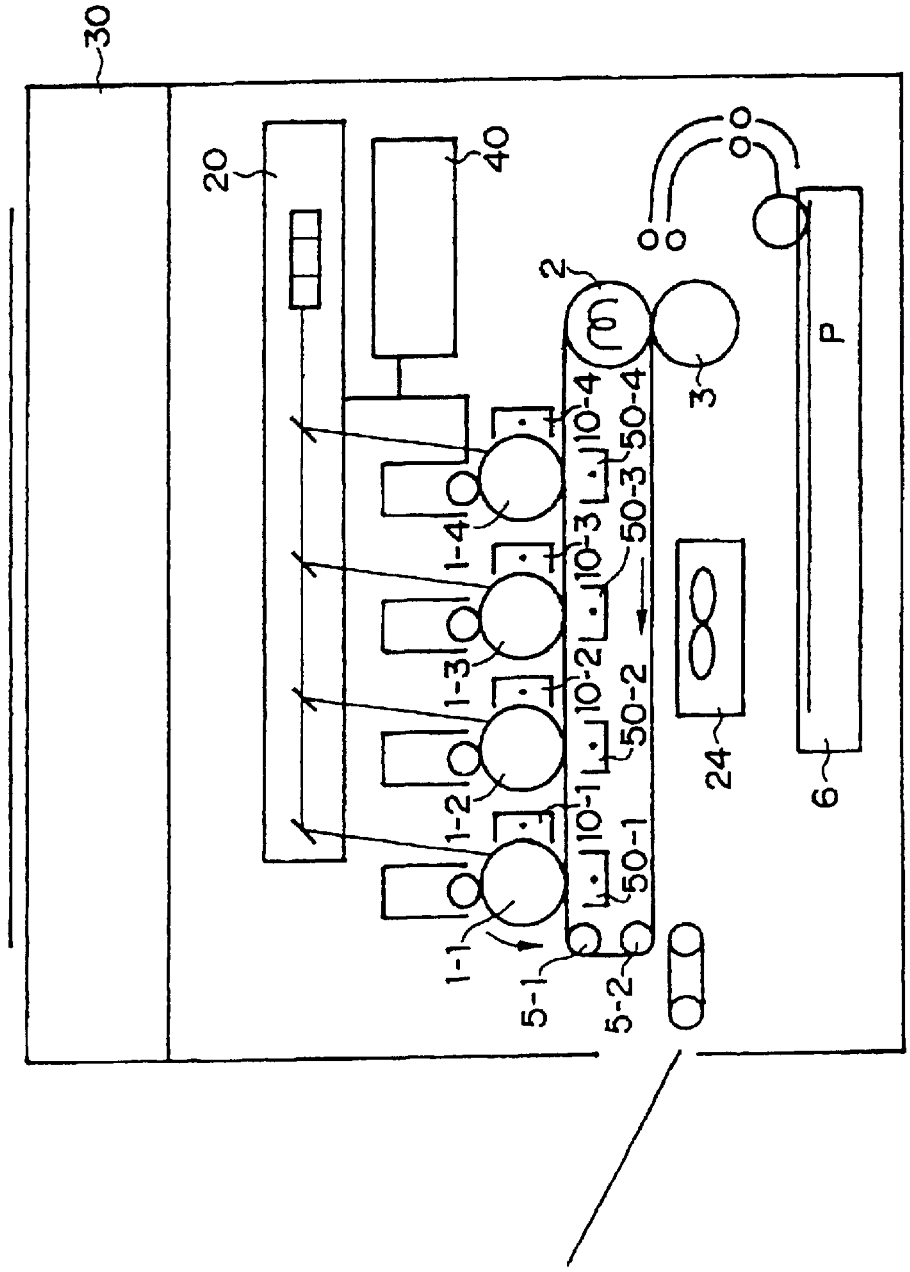
FIG. 7 is a conceptional view of an image forming apparatus 1 used in a preferred embodiment.

FIG. 7 is a conceptional view of an image forming apparatus used in the method of forming images according to the present invention. In FIG. 7, the numeral 50 indicates a belt-shaped intermediate transfer material, which rotates in a direction of an arrow being supported by rollers 5-1, 5-2 and a heat roll 2. The heat roll 2 is opposed to a press roll 3. The heat roll 2 and the press roll 3 may be arranged in an opposite arrangement. Further, the press roll 3 may be constituted as a heat roll having a heat source inside. Four light sensitive materials 1-1, 1-2, 1-3, 1-4 are disposed on the periphery of the intermediate transfer material 50, and they are charged uniformly by chargers 10-1, 10-2, 10-3, 1-4 and then exposed by an optical beam scanning device 20 adapted to be turned ON and OFF by an optical beam pulse width modulator in accordance with density signals and formed with electrostatic latent images respectively. Electrostatic latent images in each of the light sensitive materials are developed in developers 11, 12, 13, 14 containing toner of black, yellow, magenta and cyan respectively, and toner of each color of so-called digital images representing the density by area modulation is formed on the light sensitive materials respectively. The toner images of each color are successively transferred by way of transfer devices 50-1, 50-2, 50-3 and 50-4 to the intermediate transfer material 50 and toner images of a plurality of colors are formed on the intermediate transfer material 50.

The press roll 3 is in press contact with the heat roll 2 along with feed of the recording medium P from a tray 6. Then, the intermediate transfer material 50 supporting the toner images of a plurality of colors and the recording medium P are moved in a timed relation through a portion between the heat roll 2 and the press roll 3 and then heated under pressure. The toner heated beyond the melting point is softened and melted, adhered and impregnated to the recording medium P and then solidified to carry out transferring and fixing. The cooling device 4 cools the light sensitive material 1 and the recording medium P transported integrally from the heating zone, by which the toner is coagulated and solidified to cause strong adhesion relative to the recording medium P. The intermediate transfer material 50 and the recording paper P cooled by the cooling device 4 are transported, during which the recording medium P is separated together with the toner from the intermediate transfer material 50 by the stiffness of the recording medium P itself, at a roll 5-2 of a small radius of curvature, to form color images. The surface of the toner images transferred and fixed to the recording medium P is smoothed conforming the surface of the intermediate transfer material 50, to be provided with high gloss.

For the light sensitive materials 1-1, 1-2, 1-3, 1-4, various kinds of inorganic photosensitive materials (Se, a-Is, a-sic, CDs) as well as various kind of organic light sensitive materials can be used.

The toner is composed of a thermoplastic binder containing a pigment such as yellow, magenta and cyan, for which known materials may be used. In this embodiment, the polyester toner shown in Table 2 was used. The toner had a weight average molecular weight (Mw) of 54000 and a softening point (Tmt) of 120° C. The average grain size of the toner used was 7 μm. Further, the exposure condition or developing condition was set such that the amount of the toner on the recording medium for each color was 0.4 $mg/cm^2$ to 0.7 $mg/cm^2$ depending on the content of the pigment in the toner. In this embodiment, the amount was set to 0.65 $mg/cm^2$ for each color.

The diameter of the optical beam used for the optical beam scanning device 20 was set to 20 μm so as to obtain high contrast images.

The intermediate transfer material 50 used had a two-layer structure of a base layer and a surface layer.

The base layer used was a polyimide film of 70 μm incorporated with carbon black. For transferring the toner images electrostatically from the light sensitive material to the intermediate transfer material with no image disturbance, in this embodiment the volume resistivity of the base layer was adjusted to $10^{10}$ Ωcm by varying the addition amount of the carbon black. As the base layer, a sheet, for example, of 10 to 300 μm thickness having high heat resistance can be used. For example, a polymer sheet of polyester, polyethylene terephthalate, polyether sulfone, polyether ketone, polysulfone, polyimide, polyimideamide and polyamide can be used.

Further, for transferring the toner images from the light sensitive material to the intermediate transfer material electrostatically with no image disturbance, the volume resistivity of the surface layer was adjusted to $10^{14}$ Ωcm. Further, for improving adhesion between the intermediate transfer material and the paper with the toner images being put between when transferring/fixing are conducted simultaneously from the intermediate transfer material to the paper, a silicone copolymer having a rubber hardness of 40° and a thickness of 50 μm was used. The silicone polymer is optimal to the surface layer, since it has elasticity, with the surface thereof exhibiting adhesion to the toner at the normal temperature and, further, has a characteristic to easily separate the molten and fluidized toner in order to transfer the toner to the recording medium efficiently. For the surface layer, a resin layer, for example, of 1 to 100 μm in thickness and having a high releasability can be used, and tetrafluoroethylene, perfluoroalkyl vinyl ether copolymer and polytetrafluoroethylene can be used for the resin layer.

As the heat roll and the press roll, a metal roll having a heat resistant elastic layer such as of silicone rubber disposed thereon can be used. A heat source was disposed inside the heat roll, and the heating temperature was set and controlled such that the heating temperature is higher than the toner softening point (Tmt) at the upstream of a position where the toner is transferred/fixed from the intermediate transfer material to the recording medium. Further, the heating zone was set such that the light sensitive material 1, the toner image and the recording paper P were brought into close contact in the heating zone without causing partial raising or without causing creasing or dislocation to the recording medium P. The nip pressure is appropriately within a range from $1\times10^3$ Pa to $1\times10^6$ Pa. In this embodiment, a hollow aluminum roll laminated with silicone rubber of 45° hardness was used as the press roll, while a halogen lamp was used as the heat source inside the heat roll. The nip pressure was set to $5.0\times10^5$ Pa.

In this embodiment, the temperature at the surface of the recording medium in contact with the intermediate transfer material was adjusted to 70° C. upon peeling of the recording medium from the intermediate transfer material by controlling the blowing amount of the cooling device 4.

Vertical lines having 200 lines were used for the screen.

Image gloss and curling were evaluated in the constitution described above at a transportation speed of the intermediate transfer material and the toner image of 260 mm/s.

Evaluation for the image gloss was carried out by outputting 2×2 cm patches for Y (yellow), M (magenta), C (cyan), K (black), R (red), G (green), B (blue) and PB (three colors, black) for on input image area ratio of from 0 to 100% at every 10% interval, and conducting measurement by using a 75° mirror gloss gage meter. Curling was evaluated by judging the extent of the curling formed on the A4-size recording medium with naked eyes after printing the images.

Examples 1–9

Comparative Examples 1–18

Using the recording apparatus as described previously, color images were formed to those samples in which the coating thickness of the thermoplastic resin for each of the recording mediums P1–P9 was set as 10, 20, 25 μm respectively. The extent of the curling after forming the images was evaluated with naked eyes based on the following standards and the results are shown in the following Table 3. Among them, uniformness of the gloss for the resultant images was evaluated with naked eyes based on identical standards for those with the extent of the curling being within an allowable range. The results are also shown together in Table 3.

(Evaluation Standard)

A: good

B: tolerable or permissible level

C: poor (not allowable)

TABLE 3

| | Recording medium | Substrate | E-$t^3$ (N-mm) | Coating thickness (μm) | Tmp-Tmt (° C.) | Curling | Uniformness of gloss |
|---|---|---|---|---|---|---|---|
| Example 1 | P1 | K1 | 11.7 | 10 | −31 | A | A |
| Example 2 | P1 | K1 | 11.7 | 20 | −31 | A | A |
| Example 3 | P1 | K1 | 11.7 | 25 | −31 | B | A |
| Example 4 | P2 | K1 | 11.7 | 10 | −20 | A | A |
| Example 5 | P2 | K1 | 11.7 | 20 | −20 | A | A |
| Example 6 | P2 | K1 | 11.7 | 25 | −20 | B | A |
| Example 7 | P3 | K1 | 11.7 | 10 | +11 | A | B |
| Example 8 | P3 | K1 | 11.7 | 20 | +11 | A | B |
| Example 9 | P3 | K1 | 11.7 | 25 | +11 | B | B |
| Comp. Example 1 | P4 | K2 | 7 | 10 | −31 | C | |
| Comp. Example 2 | P4 | K2 | 7 | 20 | −31 | C | |
| Comp. Example 3 | P4 | K2 | 7 | 25 | −31 | C | |
| Comp. Example 4 | P5 | K2 | 7. | 10 | −20 | C | |
| Comp. Example 5 | P5 | K2 | 7 | 20 | −20 | C | |
| Comp. Example 6 | P5 | K2 | 7 | 25 | −20 | C | |
| Comp. Example 7 | P6 | K2 | 7 | 10 | +11 | C | |
| Comp. Example 8 | P6 | K2 | 7 | 20 | +11 | C | |
| Comp. Example 9 | P6 | K2 | 7 | 25 | +11 | C | |
| Comp. Example 10 | P7 | K3 | 2.7 | 10 | −31 | C | |
| Comp. Example 11 | P7 | K3 | 2.7 | 20 | −31 | C | |
| Comp. Example 12 | P7 | K3 | 2.7 | 25 | −31 | C | |
| Comp. Example 13 | P8 | K3 | 2.7 | 10 | −20 | C | |
| Comp. Example 14 | P8 | K3 | 2.7 | 20 | −20 | C | |
| Comp. Example 15 | P8 | K3 | 2.7 | 25 | −20 | C | |
| Comp. Example 16 | P9 | K3 | 2.7 | 10 | +11 | C | |
| Comp. Example 17 | P9 | K3 | 2.7 | 20 | +11 | C | |
| Comp. Example 18 | P9 | K3 | 2.7 | 25 | +11 | C | |

As shown by the results, it has been found that curling was reduced and images of highly uniform gloss could be obtained in all of examples 1 to 9 using a substrate having E·$t^3$ of 8 N·mm or more according to the present invention as the substrate for the recording medium, that the recording mediums of Example 1, 2, 4, 5, 7, 8 having transparent resin layer with a thickness of 20 μm or smaller were particularly excellent in the curl preventive effect, and that Examples 1 to 6 in which the softening point (Tmp) of the transparent resin relative to the softening point (Tmt) used for the image formation was within a range from +10° C. to −40° C. (Tmt−40° C.≦Tmp≦Tmt+10° C.) could reduce curling and provide images particularly excellent in the uniformness of image gloss in comparison with Examples 7 to 9.

The method of forming the images according to the present invention can provide an excellent effect that the image gloss is uniform and identical with that of the recording medium irrespective of the image density and image area ratio, no color shadow is caused and, particularly, curling of the recording medium after image formation is extremely slight. Furthermore, according to the recording medium of the present invention, images with uniform gloss can be obtained, and curling in the recording medium after image formation is extremely slight.

What is claimed is:

1. A method of forming an image for transferring, to a predetermined recording medium, a toner image transported to a transfer position by a toner image support for supporting and transporting toner image from a predetermined toner image position to a predetermined toner image transfer position, the method comprising the steps of:

adhering a transported toner image to the recording medium, and transferring and fixing the image while heating it; and using the recording medium which has a thermoplastic light transmissive resin layer disposed on a surface of a substrate, and in which a tensile modulus of elasticity E (N/$mm^2$) in a cross direction (CD direction) of the substrate of the recording medium and a thickness (t) mm of the substrate satisfy the following relation (1):

$$E \cdot t^3 \geqq 8 (N \cdot mm).$$

2. The method of forming an image as defined in claim 1, wherein the thermoplastic light transmissive resin layer disposed on a surface of said substrate of the recording medium has a thickness of 2 to 20 μm.

3. The method of forming an image as defined in claim 1, wherein:

the softening point of the light transmissive resin (Tmp) constituting the thermoplastic light transmissive resin layer disposed on the surface of said recording medium, relative to the softening point of a toner (Tmt) used for forming an image, is within a range (Tmt−40° C.≦Tmp≦Tmt+10° C.);

said toner image support is heated to a surface temperature higher than the softening point of the toner (Tmt) till the support reaches the toner image transfer position, and said recording medium is peeled from the toner support downstream of said transferring/fixing position when the surface temperature (T) of the thermoplastic light transmissive resin layer disposed on the surface of said recording medium goes down by 10° C. or more below the softening point of said light transmissive resin (Tmt), that is, upon reaching (T≦Tmt−10° C.).

4. A recording medium having a thermoplastic light transmissive resin layer on at least an image recording surface of a substrate, wherein the relation between the tensile modulus of elasticity E ($N/mm^2$) in the cross direction (CD direction) of the substrate of said recording medium and the thickness (t) mm of the substrate satisfies the following relation:

$$E \cdot t^3 \geqq 8 (N \cdot mm).$$

5. The recording medium as defined in claim 4, wherein the thickness of said thermoplastic light transmissive resin layer is from 2 to 20 μm.

6. The method of forming an image as defined in claim 1, wherein the relation between the tensile modulus of elasticity E ($N/mm^2$) in the cross direction (CD direction) of the substrate of said recording medium and the thickness (t) mm of the substrate satisfies the following relation:

$$E \cdot t^3 \geqq 10 (N \cdot mm).$$

7. The method of forming an image as defined in claim 3, wherein the softening point of said light transmissive resin (Tmp) relative to the softening point of the toner used for forming the image (Tmp) is within a range:

$$Tmt-30° C.\geqq Tmp \geqq Tmt° C.$$

8. The recording medium as defined in claim 4, wherein a relation between the tensile modulus of elasticity E ($N/mm^2$) in the cross direction (CD direction) of the substrate of said recording medium and the thickness (t) mm of the substrate satisfies the following relation:

$$E \cdot t^3 \geqq 10 (N \cdot mm).$$

9. A recording medium used in a method of forming an image by adhering a toner image supported on an image support to a recording medium, and then transferring and fixing the image while heating it, wherein:

said recording medium has a thermoplastic light transmissive resin layer on the surface of a substrate and;

a relation between the tensile modulus of elasticity E ($N/mm^2$) in the cross direction (CD direction) of the substrate of said recording medium and a thickness (t) mm of the substrate satisfies the following relation:

$$E \cdot t^3 \geqq 8 (N \cdot mm).$$

10. The recording medium as defined in claim 9, wherein the relation between the tensile modulus of elasticity E ($N/mm^2$) in the cross direction (CD direction) of the substrate of said recording medium and the thickness (t) mm of the substrate satisfies the following equation:

$$E \cdot t^3 \geqq 10 (N \cdot mm).$$

11. A recording medium used in a method of forming an image by adhering a toner image supported on an image support to a recording medium, and then transferring and fixing the image under heating, wherein:

a relation between the tensile modulus of elasticity E ($N/mm^2$) in the cross direction (CD direction) of the substrate of said recording medium and a thickness (t) mm of the substrate satisfies the following relation:

$$E \cdot t^3 \geqq 8 (N \cdot mm).$$

12. The recording medium as defined in claim 11, wherein the relation between the tensile modulus of elasticity E ($N/mm^2$) in the cross direction (CD direction) of the substrate of said recording medium and the thickness (t) mm of the substrate satisfies the following relation:

$$E \cdot t^3 \geqq 10 (N \cdot mm).$$

* * * * *